Figure 1:
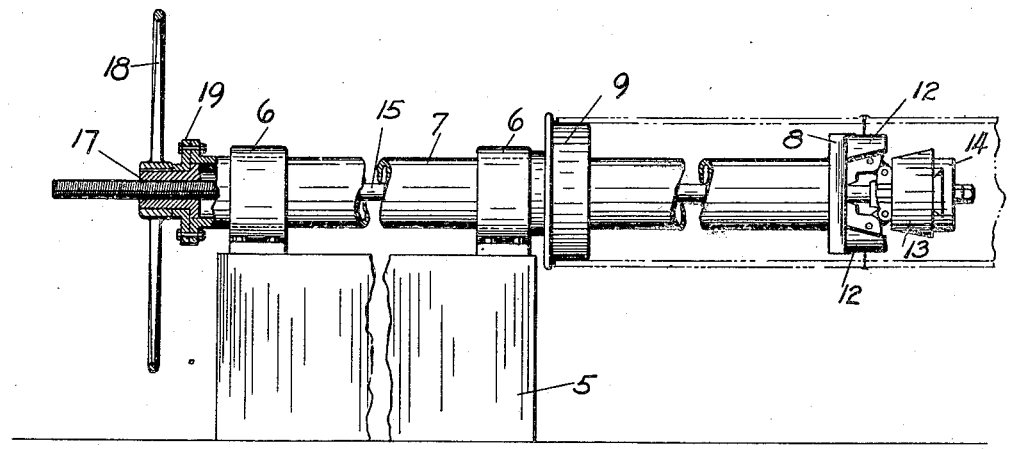

July 15, 1930.  W. J. KIRKMAN  1,770,649

WELDING MACHINE

Filed Feb. 23, 1926

INVENTOR.
W. J. Kirkman
BY
ATTORNEY.

Patented July 15, 1930

1,770,649

UNITED STATES PATENT OFFICE

WILLIAM J. KIRKMAN, OF DENVER, COLORADO

WELDING MACHINE

Application filed February 23, 1926. Serial No. 89,909.

This invention relates to machines for welding metal pipes and other cylindrical objects, and its main purpose is to provide an expansible interior support for the work which holds the parts thereof in their proper relative position while they are being united by a welding medium under exteriorly applied heat.

Another object of the invention is to provide a support of the above described character adapted to present to the work, an unbroken and continuous peripheral surface, eliminating gaps or indentations open to the molten metal as it passes through the joint between the parts to be united.

A further object is to provide at the surface of the support, a copper facing to prevent the adherence of the welding medium, and still another object is to provide an expansible support which is capable of rotary adjustment, and in operative connection therewith mechanism adapted to effect its rotary motion by the same action which caused it to expand within the cylindrical work.

In the accompanying drawings is shown a machine particularly adapted for welding end-to-end adjoining pipe-sections, by means of an electric arc applied exteriorly thereof, and constructed for manual operation.

It is to be understood, however, that the drawing represents only an illustrative embodiment of the invention and that well within the scope and spirit of the same, the construction and arrangement of the component parts of the mechanism may be varied to accommodate objects of different form, or to be operated by electrical, hydraulic, pneumatic or other power-driven means.

Figure 2:
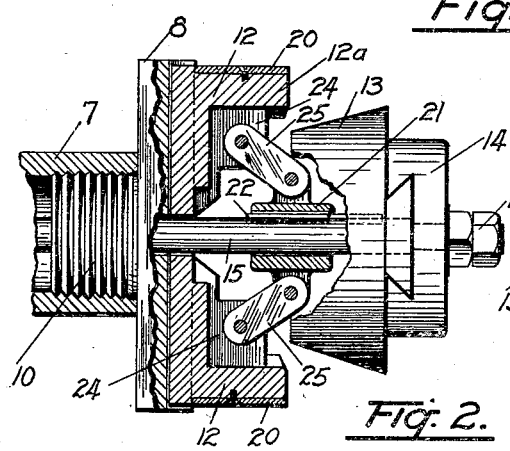
Figure 3:
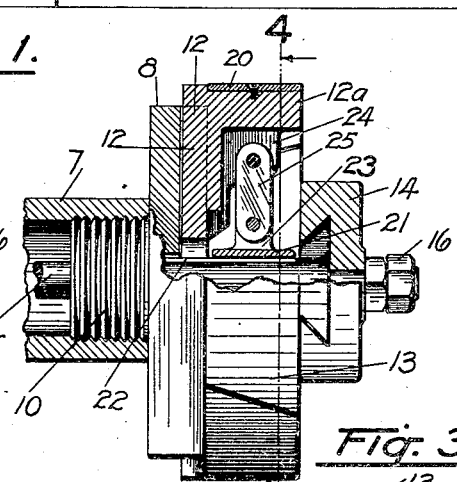
Figure 4:
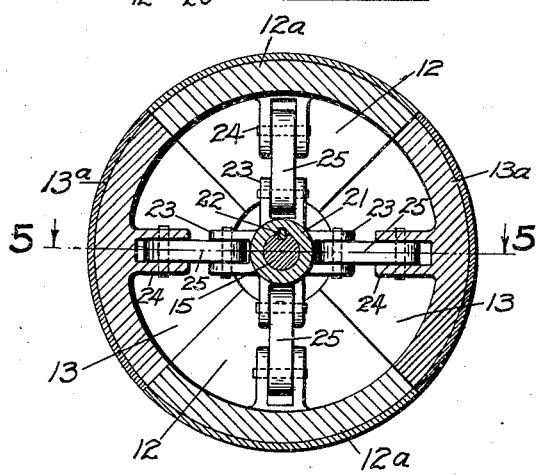
Figure 5:
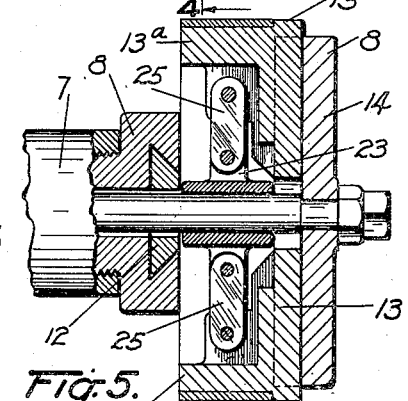

In the drawings, in the several views of which like parts are similarly designated, Figure 1 represents a partially sectional, fragmentary side-elevation of the machine, Figure 2, a sectional elevation of the expanding chuck-element of the machine with the parts thereof in their contracted and separated positions, Figure 3, a sectional view, similar to Figure 2, showing the parts of the chuck in their expanded position, in which they are assembled to conjointly support the pipe-sections placed around the chuck, Figure 4, a section taken on the line 4—4 in Figure 3, and Figure 5, a section in a plane transverse to that of Figure 3, along the line 5—5 in Figure 4.

Referring more in detail to the drawings, the numeral 5 designates a base of suitable construction on which are mounted two bearing blocks 6 for the rotary support of a hollow mandrel 7.

The mandrel has at one end a head 8 for the support of a part of the chuck element of the machine, hereinafter to be described, and it carries at a distance from the head, a flanged collar 9 which in the operation of the machine, coordinates with the chuck for the support of the work.

The head 8 is removably fastened in the end of the mandrel by a screw-threaded shank 10 and it is provided with radially extending grooves of dove-tail section for the sliding support of two of the expanding sections of the chuck.

The two sections 12 thus placed opposite each other are of segmental form and complementary to two other similarly shaped and oppositely disposed sections 13 which are slidably supported on a head 14 fastened at the end of a screw-rod 15 by nuts 16.

The rod passes co-axially through the hollow mandrel and is slidably supported in a central opening of the head 8. A cylindrical nut 17 rotatably mounted at the end of the mandrel opposite to that carrying the head 8, cooperates with a corresponding screw thread on the rod to move the rod longitudinally in the operation of the machine.

A hand-wheel 18 is keyed on the nut to facilitate its rotation, and a retaining ring 19 fastened at the end of the mandrel is engaged by a flange on the nut within the same to hold the nut against axial displacement.

The chuck sections 13 on the head at the end of the rod, are like those on the head of the mandrel, slidably fitted in opposite grooves of dove-tail section and the two pairs of sections are supported for conjunctive movement by means of a toggle joint hereinafter to be more fully described.

The four expanding sections of the chuck have rim portions 12ª and 13ª forming quadrant parts of a hollow cylinder when the sections are assembled in their expanded position. The rim portions meet at the periphery of the cylinder in lines oblique to the axis of the same, so that conjointly they will provide a continuous and unbroken cylindrical surface free from gaps, spaces, or indentations into which, in the operation of the machine, the molten metal might enter. The rim portions of the sections are faced with copper plates 20 whose function is to prevent the adherence to the chuck of molten metal passing through the joint between the pipe sections to be united.

The toggle joint hereinbefore referred to, by which the chuck sections are mounted for conjoint expansion and contraction, comprises a sleeve 21 slidably supported on the rod 15 and held against independent rotation by a feather 22.

The collar has at quadrant points, apertured double ears 23 opposite to correspondingly disposed grooved lugs 24 on the sections of the chuck and the ears and the respective lugs are connected by pivoted toggle links 25.

In the contracted condition of the chuck, the two pairs of opposite sections thereof are separated, as illustrated in Figure 2 and the pipe-joints to be welded together are placed upon the chuck and the flanged collar 9, with their abutting ends over the chuck sections at the end of the mandrel as indicated in broken lines in Figure 1. The chuck is subsequently expanded to tightly engage upon the inner surfaces of the pipe joints, by rotation of the hand wheel 18 which through the intermediary of the nut 17 effects a longitudinal movement of the screw rod 15 relative to the mandrel.

The lengthwise movement of the rod causes the sections of the chuck connected with the head thereof to move toward the complementary sections on the head of the mandrel, while the links 25 are compelled to move to a position at right angles to the axis of the rod by sliding movement of the sleeve 21. The movement is continued until the four sections are in circular alinement when their peripheral faces present a continuous cylindrical surface tightly engaging upon the inside of the pipe-joints.

Further rotation of the hand wheel will result in a rotary movement of the mandrel in its bearings, thereby allowing of the joint between the pipe-sections being brought to the point of operation along the entire length thereof.

The oblique edges of the chuck sections at which they adjoin one another in their expanded position, are preferably formed convergingly with relation to each other so that the sections may be tightly wedged together and thereby eliminate any spaces or indentations into which the metal molten in the welding operation might enter.

After the welding operation, usually accomplished through the medium of an electric arc, is completed, the chuck is contracted by turning the hand wheel in reversed direction, thereby causing its sections to disengage the jointed pipe, which is accomplished with particular ease owing to the fact that the copper facings of the sections prevent the adherence of the molten metal.

As stated hereinbefore, different means from those shown in the drawings, power-driven if required, may be employed for the expansion, contraction and rotation of the chuck and other variations, mostly relating to details of construction and the arrangement of the elements and parts comprised in the machine, may be resorted to within the scope of the invention.

What I claim and desire to secure by Letters Patent is:

1. A welding machine comprising an expanding chuck composed of sections meeting peripherally in circular alinement and forming a continuous cylindrical supporting surface, the sections being adapted to separate in axial direction, mechanism to thus separate the sections, and a radially disposed toggle joint slidably supported and actuated by movement of the sections to simultaneously cause their inward movement without breaking the continuous cylindrical supporting surface formed by the said sections.

2. A welding machine comprising an expanding chuck composed of sections meeting peripherally in circular alinement and forming a continuous cylindrical supporting surface, the sections being adapted to separate in axial direction, mechanism to thus separate the sections, a slidable member movable in the axis of the chuck, and pivoted radially movable links connecting said member with the sections the axial and radial movement of the sections varying the diameter of the supporting surface without breaking its continuous cylindrical form.

3. A welding machine comprising a mandrel provided with a fixed head, a slidable head spaced from the fixed head, said heads having radial dove-tail grooves, two sets of expanding chuck sections, one set having tongues fitting in the grooves of one of said heads and the other set having tongues fitting in the grooves of the other head, said sections meeting in circular alignment upon approach of the sliding head towards the fixed head, a slidable support member located between the heads, and toggle links carried by the slidable support member and pivotally connected with the same and with the two sets of sections.

4. A welding machine comprising a mandrel provided with a fixed head, a slidable head spaced from the fixed head, said heads having radial dove-tail grooves, two sets of expanding chuck sections, one set having tongues fitting in the grooves of one of said heads and the other set having tongues fitting in the grooves of the other head, said sections meeting in circular alignment upon approach of the sliding head towards the fixed head, and mechanism to move the sections to and from their aligned position.

5. A welding machine comprising a mandrel provided with a fixed head, a slidable head spaced from the fixed head, said heads consisting of disks provided in their opposed faces with radially arranged guides, two sets of expanding chuck sections, one set being slidable radially in the guides of one of said heads and the other set being slidable radially in the guides of the other head, a slidable support member located between the heads, and toggle links carried by the slidable support member and pivotally connected with the same and with the two sets of sections.

In testimony whereof, I have hereunto set my signature.

WILLIAM J. KIRKMAN.